April 4, 1950
V. DAHLMAN
2,502,560
ELECTRICAL GAS CLEANER UNIT
Filed Oct. 18, 1946
3 Sheets-Sheet 1
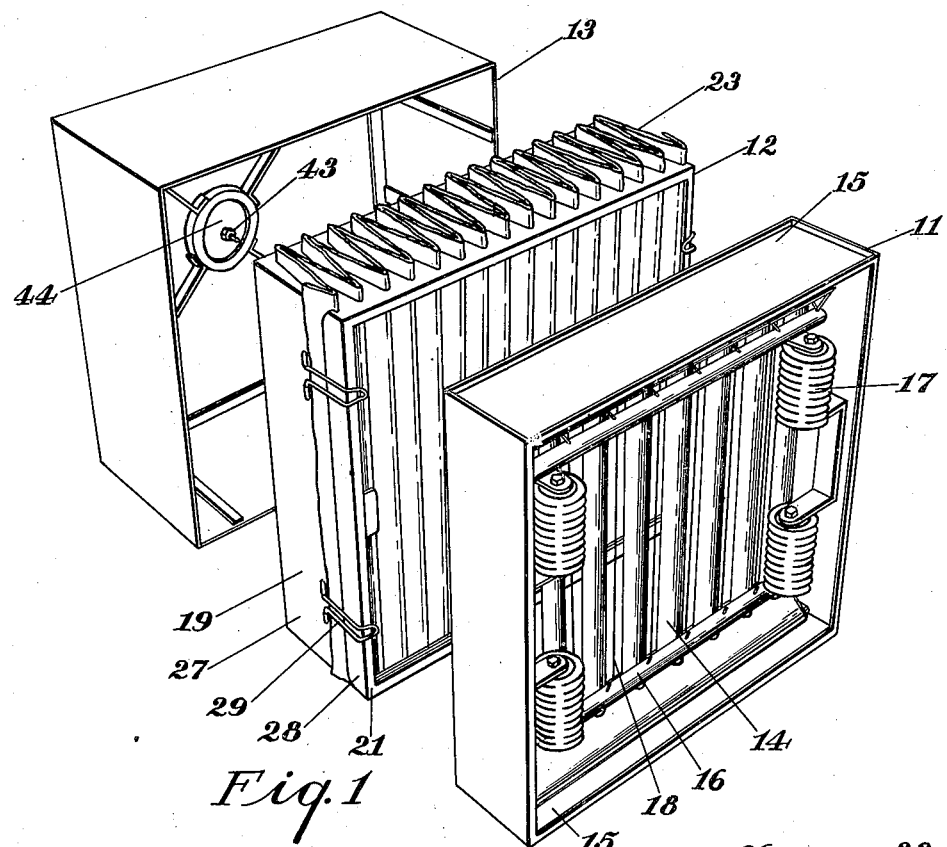
Fig. 1
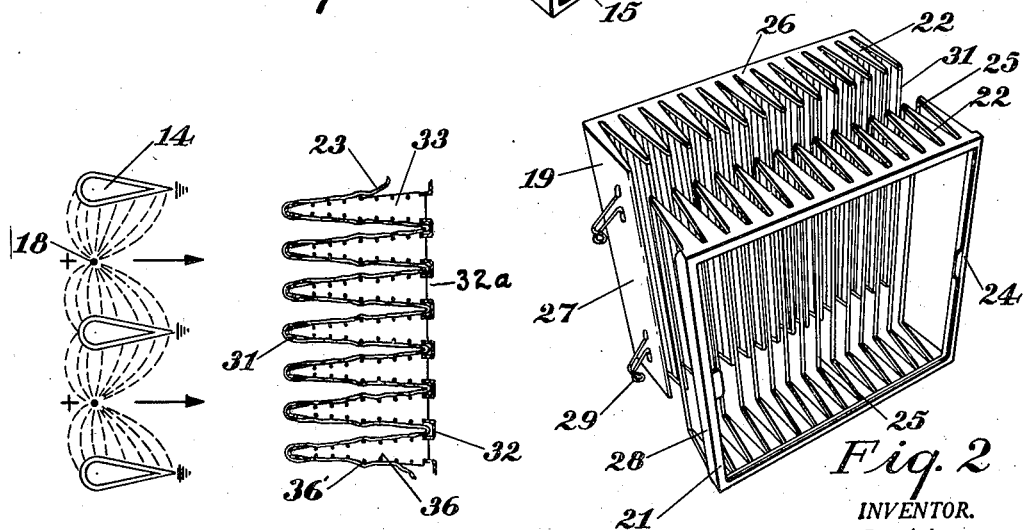
Fig. 10
Fig. 2
INVENTOR.
Verner Dahlman
BY
Arthur F. Robert
ATTORNEY April 4, 1950  V. DAHLMAN  2,502,560
ELECTRICAL GAS CLEANER UNIT
Filed Oct. 18, 1946  3 Sheets-Sheet 2

INVENTOR.
Verner Dahlman
BY
Arthur F. Robert
ATTORNEY

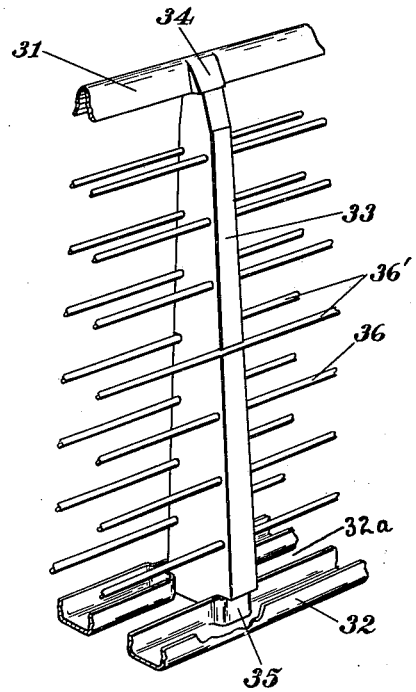
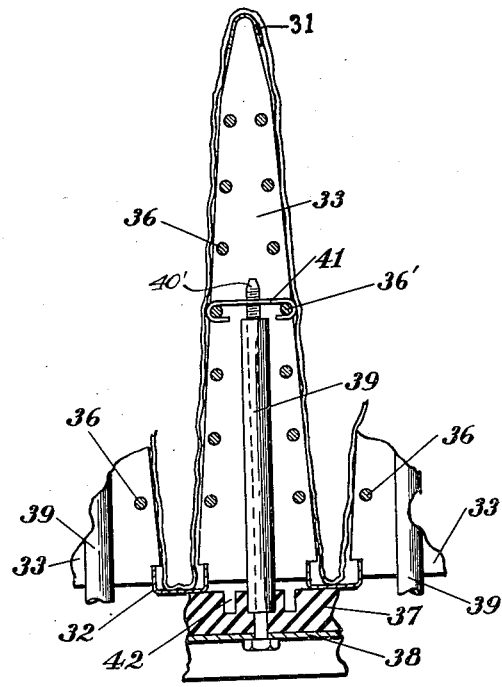
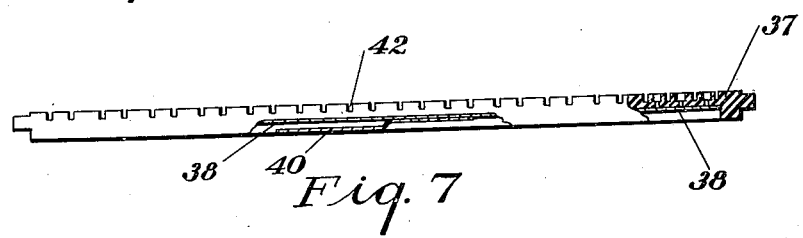
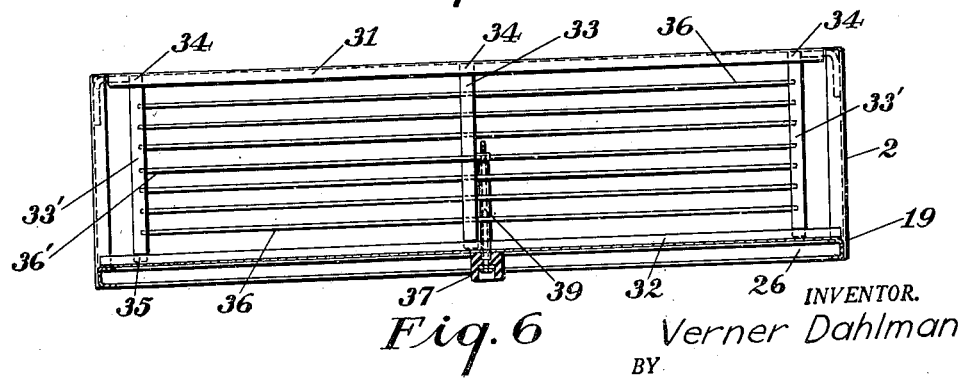

Patented Apr. 4, 1950

2,502,560

UNITED STATES PATENT OFFICE 2,502,560

ELECTRICAL GAS CLEANER UNIT

Verner Dahlman, New Lenox, Ill., assignor to American Air Filter Company, Inc., Louisville, Ky., a corporation of Delaware Application October 18, 1946, Serial No. 704,064

13 Claims. (Cl. 183—7)

This invention relates to an electric gas cleaner, and more particularly to an improvement over the electric gas cleaner and dust collector disclosed in Williams Patent 2,297,601 of September 29, 1942.

The Williams patent discloses an electric gas cleaner of the type wherein an ionizer and a collector are arranged in series in the path of gas flow, the gas-borne dust particles being charged by the ionizer and subsequently collected on a dielectric filter medium in the collector, the filter medium being given an electrostatic charge. In improving over the Williams structure, it is an object of this invention to provide an improved collector wherein novel means are provided for maintaining the desired electrostatic charge on the filter medium.

Another object of this invention is the provision of novel supporting means for the filter medium.

Another object of the invention is to provide a novel arrangement of an ionizer with collector units wherein a single ionizer charges the dust particles for a plurality of collectors and the cost and maintenance of additional ionizers, hitherto considered necessary, is eliminated.

Other objects and advantages of the invention will be apparent from the following description and claims taken in connection with the attached drawing, wherein:

Fig. 1 is an exploded perspective of one embodiment of the invention showing the ionizer, the collector and the frame for the collector;

Fig. 2 is an exploded perspective of the collector, less the filter medium;

Fig. 4 is a perspective fragmentary view of one of the intermediate internal supports for the filter medium and the wire network used therewith in one form of the collector;

Fig. 5 is a front elevation of the support of Fig. 4 with parts in section;

Fig. 6 is a side elevation of a single supporting assembly using the support of Figs. 4 and 5;

Fig. 7 is an elevation of the bus bar as viewed in Fig. 5;

Fig. 10 is a diagram illustrating the manner of operation of the invention; and

Figure 3:
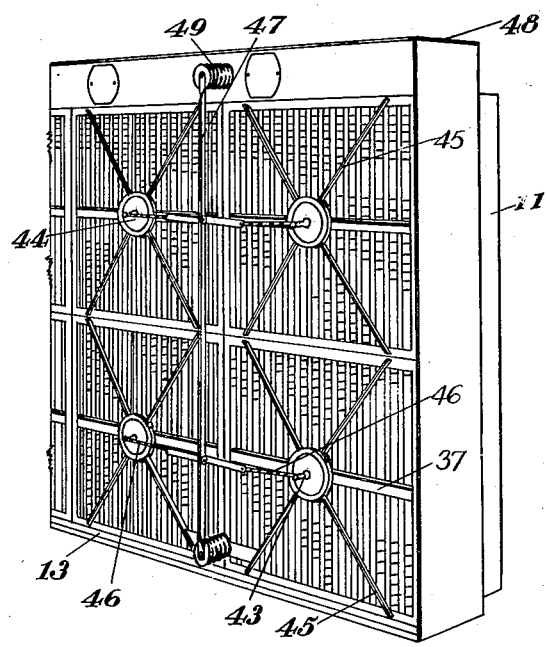
Fig. 3 is a perspective of a battery of the elements of Fig. 1.

Fig. 1 is an exploded view of a preferred embodiment of the invention comprising an ionizer 11, a collector 12, and an enclosing frame 13 for the collector. Ionizer 11 is of generally conventional form and includes a plurality of grounded electrodes 14, supported on the upper and lower walls 15 of the housing, bus bars 16, supported in insulated relation on the housing by insulators 17, and a plurality of ionizing wires 18, supported from the bus bars in a manner to be positioned between grounded electrodes 14 as shown in Fig. 10. Suitable connections (not shown) are provided from bus bars 16 to the conventional power pack (not shown).

Collector 12, shown in exploded form in Fig. 2 with the filter medium omitted, includes casing elements 19 and 21, each element being formed with a plurality of complemental V-shaped members 22 arranged to interfit with one another and support the edges of a filtering medium therebetween such as a paper medium 23 (Fig. 1) composed of a plurality of superimposed, separable layers of sheet-like fibrous material, wherein each sheet comprises a thin, matted, network of short-fibered wood pulp, characterized by a multitude of fine "air strainer" openings. Such a medium is disclosed in Patent 1,897,976 of February 14, 1933. A frame of generally the same type is disclosed in Nutting Patent 2,211,382 of August 13, 1940. The arrangement of the filter medium in this zig-zag fashion insures a minimum of resistance to the air flow.

As shown in Fig. 2, element 21 is formed in skeleton form with a generally rectangular base 24, V-shaped members 22 extending from opposed ends thereof, and a series of longitudinal members 25 connecting the apexes of opposed members 22. Element 19 is formed with a base 26 having opposed side walls 27 arranged to fit beneath flanges 28 on element 21 and seal and secure the filter medium in place. Latches 29 on side walls 27 are arranged to lock the two elements together.

V-shaped members 22 on element 19 are connected in pairs at their apexes by longitudinal members 31, members 22 being joined at their bases as troughs by channels 32 (Figs. 4 and 5) connecting opposed side walls of the casing element. The metal frame 19 provides a pair of spaced grids secured thereto, one grid being made up of the channel members 31, and the other grid being composed of the oppositely facing channel members 32, the members 31 being staggered with relation to members 32. The grids are arranged across the path of gas flow, and the filter medium is folded in a plurality of zig-zag panels across the grids with one series of folds passing over the members 31, and the other series being received in the channels 32. In assembled position the complementary frame 21 clamps the edges of the filter medium and the connecting members 25 hold the folds in the channels 32. Thus, the filter panels are grounded at their edges by the frame and connecting members 25, 31 and 32.

A plurality of generally triangular-shaped elements 33 of a suitable dielectric material such as a synthetic rosin, porcelain, or the like, are secured in spaced relation and preferably three in number between the upper and lower side walls of element 19, as viewed in Fig. 1, the elements being supported by their engagement with protuberant sections 34 of members 31 and indented sections 35 of channels 32 as shown in Fig. 4. The centrally disposed insulators 33 are apertured to receive and support a plurality of sets of wires 36 extending the height of the housing and in contact only with their supporting members and the filter medium. The end members 33' (Fig. 6) are only partially apertured to insulate the ends of the wires 36 from the adjacent metal housing.

The insulators 33 are notched approximately midway between their ends to receive electrodes in the form of wires or rods 36'. An insulating bar 37 of dielectric material, such as synthetic resin or the like, has its opposed ends secured to opposed sides of the casing 19; and a metal strip or bus bar 38 is carried by the insulating bar 37 and suitably secured thereto. Bars 37 and 38 are bored and counterbored at intervals to receive sleeves 39 through which passes a conductor member 40' the head of which engages bus bar 38. The inner projecting end of each conductor member 40' is threaded through the middle eye of a metal clip 41 which extends from the wire 36' of one panel to the corresponding wire of the adjacent panel. The clip 41 retains the pairs of electrodes 36' in their respective notches in insulator supports 33, and also secures the insulator bar 38 in position on the frame. The bus bar and the connectors 40' are preferably positioned to extend adjacent the centrally disposed triangular insulators 33 as indicated in Fig. 6. The insulating bar 37 may be provided along its length with notches 42 for the purpose of increasing the length of its surface leakage paths which extend from the conductors 40' to the adjacent channels 32. The bus bar 38 is centrally provided with an electrical terminal in the form of a metal spring clip 40.

Frame 13 is of a size to contain the collector, the ionizer being preferably supported in the manner disclosed in the copending application of Verner Dahlman, S. N. 658,056, filed March 29, 1946 (now Patent No. 2,486,521 dated Nov. 1, 1949). The outlet or rear face of frame 13 contains, at its center, a terminal connection 43 mounted in an insulator 44 which is supported by diagonal bars 45. The terminal connection 43 is so disposed as to automatically engage the terminal clip 40 of the bus bar carried by the filter casing when the filter is positioned within frame 13. This outer terminal connection 43 may be connected to the conventional power pack in any suitable manner, a resistance 46 of about 50 to 90 megohms being preferably provided in the connection to hold the current leakage from the filter medium to a predetermined value, regardless of the moisture content of the filter medium. When mounted in a battery as shown in Fig. 3, the several connections 43 may be connected to a central bus bar 47 supported on the supporting cabinet 48 by insulators 49, the bus bar being connected to the power pack (not shown).

In lieu of the network of wires 36 shown in Figs. 4 and 5 the filter medium may be supported by a grid 51 of dielectric material, the upper end of the grid being secured by members 31 and the lower end in channels 32. The electrode wire 36' is carried by the grid 51 and is connected to conductor 40' by a suitable wire clip.

In operation, the ionizing wires 18 are charged with about 12,000 to 13,000 volts direct current, and the wires 36' connected to connectors 39 are charged with about 12,000 volts direct current and impart an electrical charge to the filter medium. Referring to Fig. 10, the air to be cleaned enters at the left, passing through the ionizer, the dust particles therein being charged in well known manner. Since the filter medium is also charged by wires 36' in the approximate center thereof, the magnitude of the charge tapering off toward the grounded sides or opposed edges of each filter panel, the charged particles are attracted by the filter medium, the efficiency of the filter medium being increased by the electrostatic charge thereon from about 20% to about 90%. In the event the ionizer becomes inoperative, the filter medium continues to filter in the same manner as the conventional paper filter.

It has been found that current leakages of any undesirable magnitude are prevented by the use of resistances 46, the latter functioning to hold the leakage to a predetermined maximum regardless of the moisture content of the filter medium.

Figure 11:
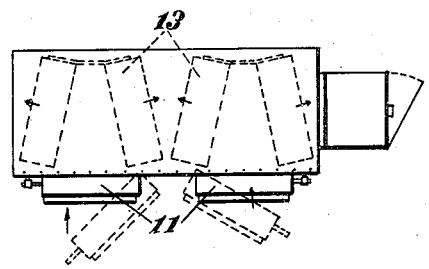
Fig. 11 is a diagrammatic plan of an arrangement wherein a plurality of collectors are combined with a single ionizer.
Figure 8:
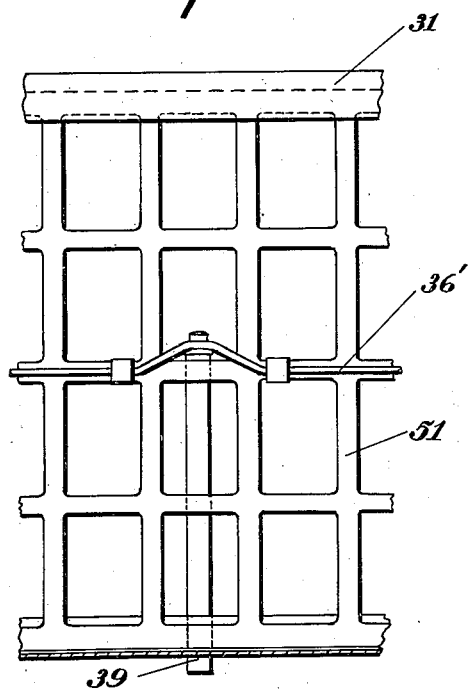
Fig. 8 is a side elevation of a portion of a modified supporting means for the filter medium.
Figure 9:
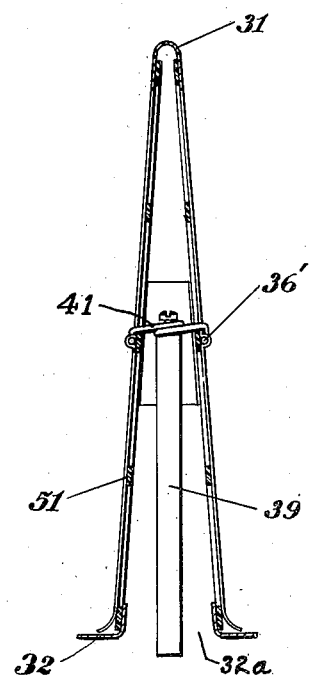
Fig. 9 is a section of the supporting means of Fig. 8.

The cleaner may be mounted as shown in Fig. 1 with a single ionizer for each collector or in the manner shown diagrammatically in Fig. 11 wherein a single ionizer 11 is arranged to charge the particles passing to a plurality of collectors in housings 13. This arrangement has been found to be substantially as efficient as that of Fig. 1 as regards cleaning of the air and is considerably less expensive since only one ionizer is used for a larger number of collectors, the initial cost and the maintenance cost of an ionizer for each collector being saved.

Having described my invention, I claim:

1. A collector for use in an electric gas cleaner in the path of gas flow therethrough, comprising: a filter panel formed of a dielectric medium and arranged to extend across the path of gas flow; means for conducting an electrical potential of one sign to the panel intermediate the ends of the panel and adjacent the middle portion; and means for conducting an electric potential of a different sign to the edge of said panel.

2. Supporting means for a dielectric filter medium in a dust collector of the electrostatic type positioned in a path of gas flow wherein the filter medium is arranged across the path of gas flow in a series of zig-zag panels, comprising: a base; a grid-like assembly of spaced members mounted on the base to extend transversely across the flow; a plurality of dielectric supports which project from said members in a direction more or less parallel to the flow and which present in the same direction converging margins shaped to the slope of adjacent panels; and a skeleton-like frame secured to extend along each sloped margin of each support and arranged to support a filter panel against the gas flowing thereagainst while permitting the gas to flow therethrough.

3. An electrical gas cleaner unit comprising: an open ended rectangular casing adapted to be electrically grounded; a grid-like structure extending across each open end of the casing and secured thereto, each structure being composed of rigid metal strips extending from one side wall of the casing to the opposed side wall so as to form slot-like openings between adjacent strips on each end, the strips on one end being off-set from the strips on the other end; an open work structure insulatedly mounted between grids to extend from the first grid strip on one end to the first off-set grid strip on the opposite end and from said off-set strip to the second strip at said one end and proceeding in like manner across the casing, said open work structure cooperating with the strips to form a series of panels individually extending between grid strips at opposite ends of the casing and collectively extending in zag-zag relationship across the casing interior, each panel being electrically grounded along its margins and provided in its central surface area portion with a charging electrode insulated from ground; a sheet like filter medium extending in zig-zag relationship over the upstream face of said zig-zag panels and being operatively supported thereby in contact with said charging electrode; and a bus bar means insulatedly mounted on the unit and electrically connected to the charging electrodes of said panels.

4. In an electric gas cleaner: a conducting frame adapted to provide a support for a filter medium of dielectric material folded in a plurality of panels arranged zig-zag across the path of gas flow, said frame being adapted to embrace said panels at their respective edges to provide open spaces therebetween; electrodes extending across each open space substantially midway of said panels and carried by said frame in insulated relation thereto; means to conduct an electric potential to said electrodes.

5. In an electric gas cleaner: a frame providing a support for a filter medium of dielectric material adapted to be folded in a plurality of panels arranged zig-zag across the path of gas flow; electrodes carried by said frame in insulated relation thereto and positioned to engage said panels respectively adjacent the middle longitudinally thereof; a bus bar insulated from the frame; and means projecting from the bus bar and connected to said electrodes to hold said bus bar in position.

6. In an electric gas cleaner: a frame providing a pair of spaced grids arranged across the path of gas flow, and in which the bars of one grid are staggered between the bars of the other grid, said grids being adapted to receive a filter medium of dielectric material folded in a plurality of zig-zag panels across said grids; insulators carried between and supported by said grids; electrodes carried by said insulators substantially midway between said grids for imparting an electrostatic charge to said filter medium; clips engaging pairs of electrodes; and conductor members passing through one grid and electrically connected to said clips.

7. An apparatus as specified in claim 6 wherein said insulators each carry an openwork of conducting material insulated from the frame and adapted to support a filter medium panel within the frame.

8. In an electric gas cleaner: a frame providing a pair of spaced grids arranged across the path of gas flow, and in which the bars of one grid are staggered between the bars of the other grid, said grids being adapted to receive a filter medium of dielectric material folded in a plurality of zag-zag panels across said grids; insulators carried between said grids; a plurality of electrodes carried by said insulators and adapted to engage the filter medium panels adjacent the middles thereof respectively; transverse conducting members engaging adjacent pairs of electrodes; a channeled insulator bar extending across one grid; a bus bar in the channel of said insulator bar; and conductors secured to said transverse conducting members at one end and in electrical contact with said bus bar at the other end.

9. In an electric gas cleaner: a support for a filter medium comprising a frame having multiple V-shaped opposed ends providing a zig-zag outline; channel members connecting the apexes of pairs of said V-shaped ends and providing sockets therein; opposed channel members connecting the troughs of pairs of said V-shaped ends and having opposed pairs of recesses; an insulator member received in a socket and a pair of recesses; electrodes carried by said insulator intermediate the ends thereof; an open work support for the filter medium carried by said channel members and means conducting an electrical charge to said electrodes.

10. In an electric gas cleaner: a support providing a pair of spaced grids arranged across the path of gas flow, and in which the bars of one grid are staggered between the bars of the other grid, said grids being adapted to receive a filter medium of dielectric material folded in a plurality of zig-zag panels across said grids; insulators carried between and supported by said grids; electrodes carried by said insulators between said grids for imparting an electrostatic charge to said filter medium; clips engaging pairs of electrodes; an insulator bar extending across one grid; a bus bar carried by said insulator bar; and conductors passing through said bus bar and insulator bar and secured to said clips.

11. In an electric gas cleaner: a support for a filter medium comprising a frame having multiple V-shaped opposed ends providing a zig-zag outline; channel members connecting the apexes of pairs of said V-shaped ends and providing sockets therein; opposed channel members connecting the troughs of pairs of said V-shaped ends and having opposed pairs of recesses; V-shaped insulator members received in each socket and a pair of recesses; electrodes carried by said insulators intermediate the ends thereof; means connecting pairs of electrodes across said insulators; and means for conducting an electrical charge to said electrodes.

12. In an electric gas cleaner: a frame providing a pair of spaced grids arranged across the path of gas flow, and in which the bars of one grid are staggered between the bars of the other grid, said grids being adapted to receive a filter medium of dielectric material folded in a plurality of zig-zag panels across said grids; an open work structure of insulation material carried between said grids to support the filter medium panels; an electrode carried by said open work structure to engage said panels substantially midway between said grids; and means for conducting an electrical charge to said electrodes.

13. In an electric gas cleaner: a frame to receive a filter medium of dielectric material folded in a plurality of zig-zag panels across said grids; electrodes carried by said frame in insulated relation thereto; a bus bar insulated from said frame and electrically connected to said electrodes; said bus bar having a spring contact finger; and a housing surrounding said frame and carrying an electrical contact positioned to engage said spring finger.

VERNER DAHLMAN.

REFERENCES CITED

The following references are of record in the file of this patent:

UNITED STATES PATENTS

| Number | Name | Date |
|---|---|---|
| 2,013,038 | Dollinger | Sept. 3, 1935 |
| 2,130,806 | Link | Sept. 20, 1938 |
| 2,297,601 | Williams | Sept. 29, 1942 |
| 2,423,741 | Vokes et al. | July 8, 1947 |